United States Patent [19]

Sheaffer

[11] 4,207,190

[45] Jun. 10, 1980

[54] ROTARY VACUUM DISC FILTER

[75] Inventor: John A. Sheaffer, Wilton, Conn.

[73] Assignee: Dorr-Oliver Incorporated, Stamford, Conn.

[21] Appl. No.: 866,577

[22] Filed: Jan. 3, 1978

[51] Int. Cl.$^2$ .................. B01D 33/08; B01D 33/06
[52] U.S. Cl. .................. 210/232; 210/331; 210/332; 210/347
[58] Field of Search .................. 210/347, 331, 332, 232

[56] References Cited

U.S. PATENT DOCUMENTS

| | | | |
|---|---|---|---|
| 2,207,618 | 7/1940 | Grill et al. | 210/331 X |
| 3,409,134 | 11/1968 | Wallace et al. | 210/331 X |
| 3,452,874 | 7/1969 | Keller et al. | 210/331 |

Primary Examiner—Frank A. Spear, Jr.
Attorney, Agent, or Firm—Burtsell J. Kearns; Harold M. Snyder

[57] ABSTRACT

A rotary vacuum disc filter having a rotatable center shaft assembly mounting a plurality of filter discs each comprised of a like number of removable filter sectors aligned in horizontal rows, with each row connected to one of a plurality of longitudinally extending filtrate channels in the center shaft assembly wherein the outlet port of a selected channel at one end of the center shaft assembly may be selectively closed by a removable sealing plate to cut off flow from such channel.

8 Claims, 9 Drawing Figures

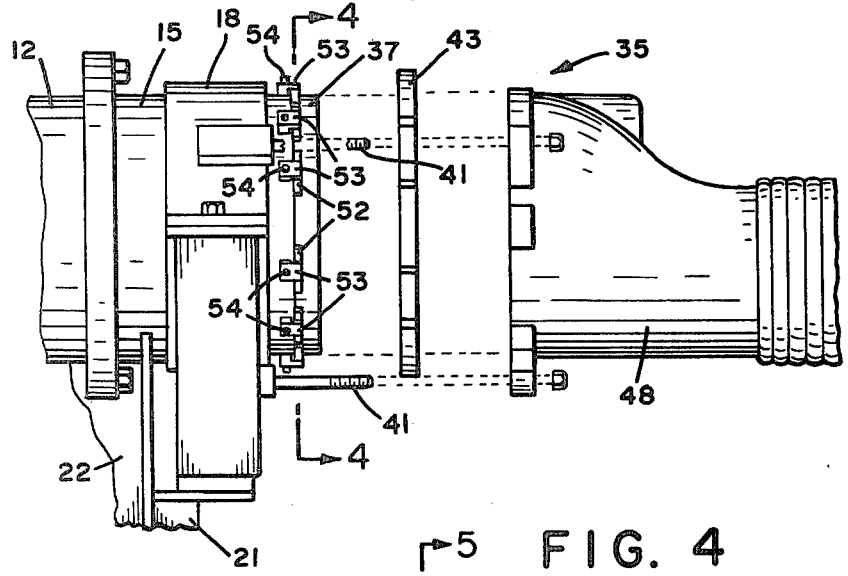
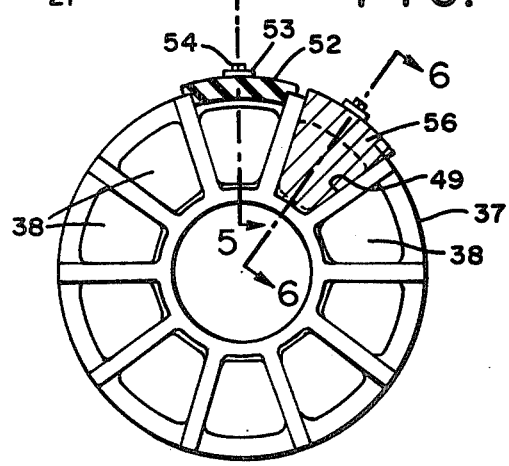
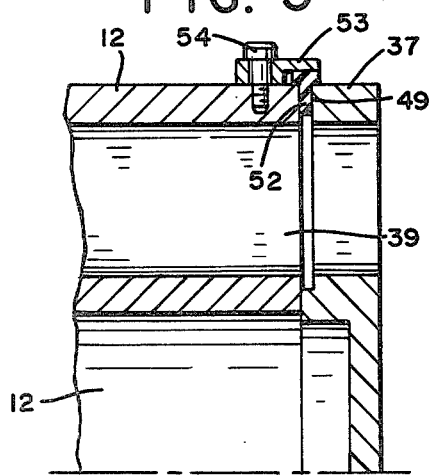
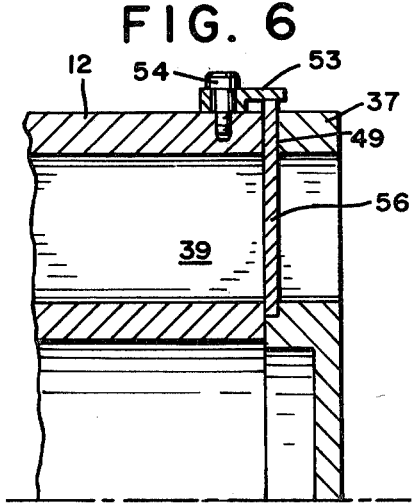

ROTARY VACUUM DISC FILTER

BACKGROUND OF THE INVENTION

The present invention is directed to improvements in filters and in particular to rotary vacuum disc filters.

Vacuum disc filters are well known and comprise banks of filter discs mounted in spaced side by side relationship on a rotatable center shaft assembly arranged within a slurry tank. Each filter disc is comprised of a plurality of V-shaped filter sectors with the filter sections of one disc aligned with the filter sectors of the adjacent discs on the center shaft. A plurality of filtrate flow channels are located in the center shaft assembly with each flow channel adapted to receive the filtrate from one row of aligned filter sectors. Each filter sector is usually provided with an outer filter media such as a filtrate bag or the like and is detachably connected to the center shaft assembly and a flow channel by means of an appropriate drainage connection.

In use the filter shaft assembly rotates the discs through the slurry in the tank and a vacuum is applied to the center shaft to draw filtrate through the filter sectors and outwardly of the filter through the filtrate channels as filter cake adheres to the surface of the filter media. At a preselected point in the filter cycle as the discs rotate out of the slurry tank the vacuum is cut off from a portion of the discs and an appropriate doctor means or snap blow means is applied to remove the filter cake from that portion of the discs prior to reentry thereof into the slurry tank.

These type vacuum disc filters have met with wide acceptance and are used in many industries. Problems have been encountered, however, in instances where damage is caused to the filter media and its associated filter sector as a result of abrasive material in the slurry. In these instances the non-filtered slurry is apt to be drawn into the filter sector and its associated filtrate channel which often results in damage thereto and contamination of the filtrate discharging from the remaining filtrate channels. It has been common practice therefore where a filter sector is damaged to discontinue operation of the filter until time is permitted for replacement of the sector itself. The latter stoppage resulted in production delays and high labor costs of operation.

It is an object of the present invention to provide a vacuum disc filter having novel means for selectively stopping the filtrate flow in a selected filtrate channel of a filter disc assembly.

Another object is to provide novel means for selectively stopping the flow of filtrate in a selected filtrate channel of a center shaft assembly of a vacuum type disc filter without causing material delay in operation of the filter.

SUMMARY OF THE INVENTION

The present invention contemplates a novel vacuum disc filter and in particular means for selectively stopping the flow of filtrate from a selected filtrate channel of a plurality of like channels in the center shaft assembly when one or more of the filter sectors in a row of aligned filter sectors of the disc assembly is damaged. The center shaft assembly is provided with an attached concentric wear plate at one end thereof intermediate the center shaft and a stationary valve assembly which controls the application of the vacuum and filtrate flow from the plurality of filtrate channels in the center shaft. In normal operation the outlet ports of each filter channel are in open communication with ports in the wear plate. A removable plug member is secured in a recessed area of the wear plate at the periphery thereof at each filtrate channel preventing leakage of filtrate from the periphery of the shaft assembly. If it is desired to stop the flow of filtrate from a filtrate channel the plug is removed and a plate member is inserted in the recessed area sealing the outlet port of the filtrate channel stopping the flow of filtrate therefrom.

The above and other objects and advantages of the present invention will appear more fully hereinafter from a consideration of the detailed description which follows taken together with the accompanying drawings wherein two embodiments are illustrated.

DESCRIPTION OF THE DRAWINGS

In the drawings:

FIG. 3 is an enlarged exploded view of one end of the center shaft assembly and the vacuum filtrate control assembly;

FIG. 4 is a sectional view taken on line 4—4 of FIG. 3;

FIG. 5 is a sectional view taken on line 5 of FIG. 4;

FIG. 6 is a sectional view taken on line 6—6 of FIG. 4;

DETAILED DESCRIPTION

Figure 1:
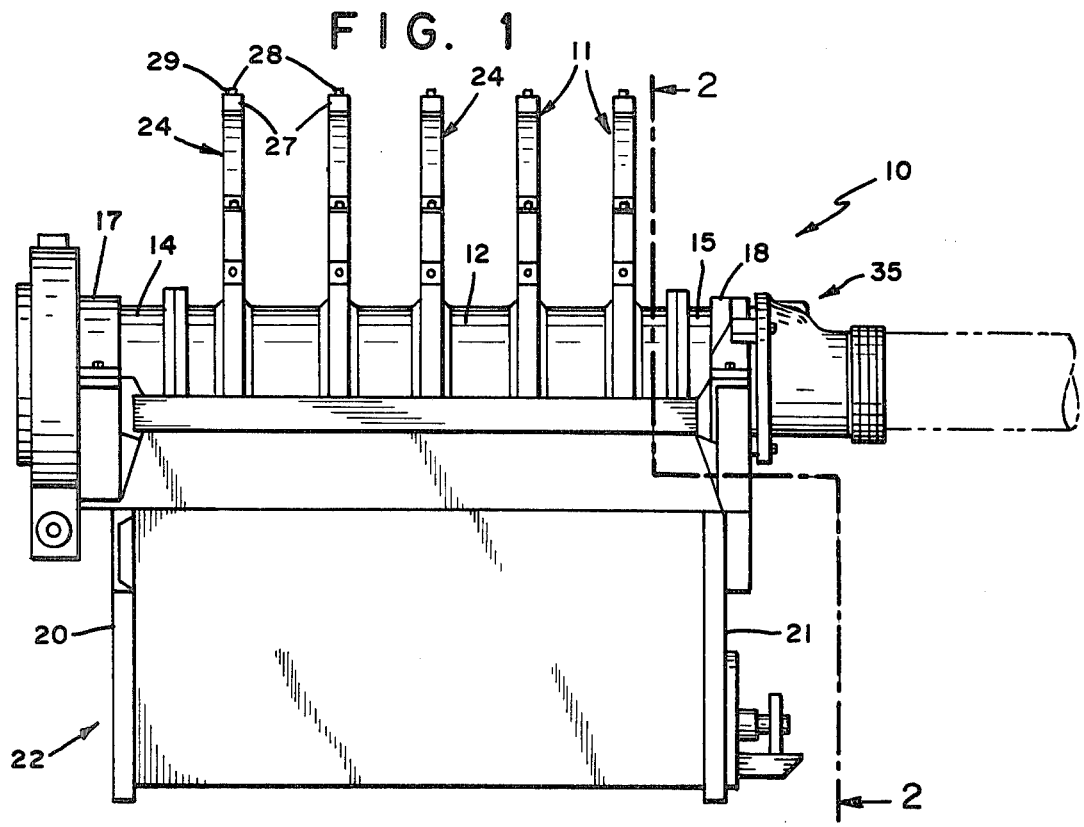
FIG. 1 is a front elevational view of a vacuum type disc filter embodying the present invention.
Figure 2:
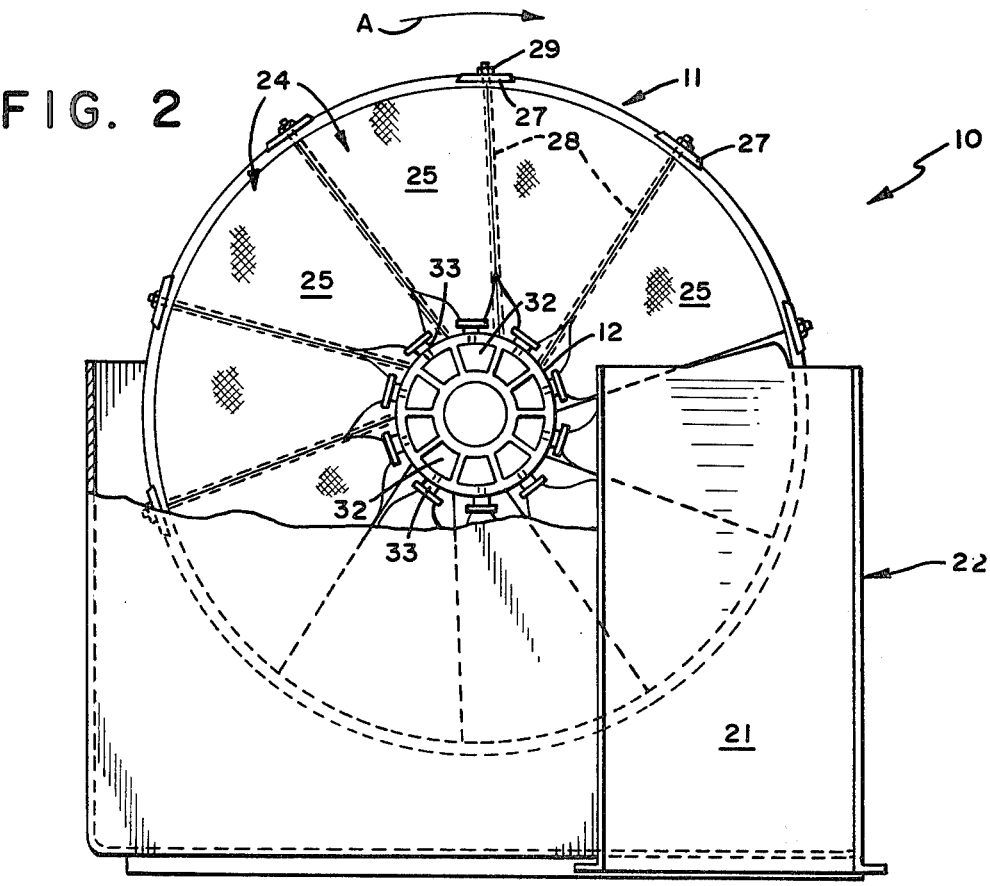
FIG. 2 is a fragmentary sectional view taken on line 2—2 of FIG 1.

Referring now to the drawings for a more detailed description of the present invention a rotary vacuum disc filter incorporating one embodiment thereof is generally indicated by the reference numeral 10 in FIGS. 1 and 2. Disc filter 10 comprises a series of filter discs 11 mounted upon a central shaft assembly 12 in horizontally spaced side by side relationship. The opposite ends of center shaft assembly 12 are mounted in spaced trunnion assemblies 14 and 15 for rotation within spaced bearing assemblies 17 and 18 mounted upon the opposite end walls 20 and 21 of a slurry tank 22 in a usual manner.

Each filter disc 11 comprises an assembly of individual V-shaped filter sectors 24 (FIG. 2) having filter media 23 such as a filter bag mounted thereon. Each sector 24 of each disc 11 registers horizontally with corresponding filter sectors 24 of all other discs 11 whereby filter sectors 24 are arranged in a plurality of aligned horizontal rows. Rotation of the filter disc assembly and shaft 12 in the direction of arrow A in FIG. 2 causes the interconnected filter sectors 24 of each disc 11 to pass sequentially through the slurry in tank 22. Filter cake is collected in a usual manner on the outer surface of filter disc 11 as filtrate is drawn into filter sectors 24 through the filter media 25. The filter cake is discharged at the descending side of rotation in any conventional manner such as by a suitable doctoring device or snap blow arrangement (not shown) to facilitate and expedite cake discharge.

Each filter sector 24 is held in interconnected relationship to the next adjacent sector 24 of its associated disc 11 by a clamp member 27 (FIG. 2) fastened to the outer periphery of portions of adjacent sectors 24. Clamp 27 is held in place in a usual manner by a draw bolt 28 connected at one end to shaft 12 and to a fastening nut 29 connected to the opposite end thereof.

A plurality of longitudinally extending filtrate discharge ducts or channels 32 are formed within center shaft 12 parallel to and equally spaced about the longitudinal axis thereof. Each channel 32 is aligned with a row of filter sectors 24 with each sector 24 detachably secured to shaft 12 by a drainage member (generally indicated by the reference number 33 in FIG. 2) interconnected to an opening in shaft 12 communicating with a channel 32.

A trunnion valve assembly 35 controls the filtration cycle incident to the rotation of center shaft 12, so that vacuum and if need be backblow air pressure may be applied to filter sectors 24 in a usual manner within zones or phases of the filtration cycle, timed relative to a required period of submergence of the filter sectors during a cake forming phase, and also after emergence at the ascending side of discs 11 during a cake drying phase, while the snapblow acts to detach the filter cake in a discharge zone at the descending side of discs 11.

Figure 7:
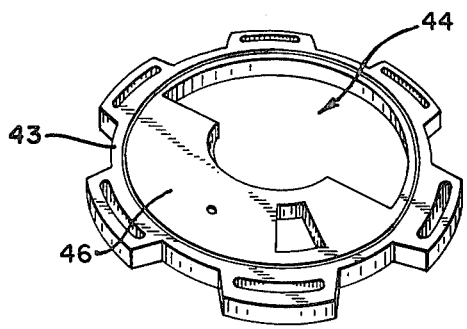
FIG. 7 is a perspective view of the bridge plate portion of the valve assembly.

Interposed between valve assembly 35 and trunnion end 15 of shaft 12 is wear plate 37 having a plurality of inlet port openings 38 which register with outlet ports 39 of filtrate channels 32. Wear plate 37 is connected in sealing relationship with trunnion 15 as by bolts 41 with wear plate 37 adapted to rotate with center shaft assembly 12 in face to face sliding contact with a stationary bridge plate 43 (FIG. 7) having an opening 44 to allow filtrate to discharge therethrough from outlet port 39 at selected phases of the filtration cycle through an open throat 48 in main housing of valve 35 in a well known manner while in other phases having solid surfaces 46 to prevent flow of the filtrate through throat 48.

The structure as hereinabove described represents generally known structure in prior art filters as for example disclosed in U.S. Pat. No. 3,452,874 to L. D. Keller et al dated July 1, 1969 and entitled "Trunnion Valve For Continuous Rotary Filters". As previously mentioned problems occur in instances where a filter sector 24 and its filter media 25 is damaged in use causing entry of slurry from tank 22 into the damaged sector 24 and its associated filter channel 32 and subsequently outwardly of filter 10 through throat 48. In known filter devices it has been necessary to shut down operation of the filter for a prolonged period of time in order to replace a damaged filter sensor. The present invention is directed to means for obviating such prolonged shutdowns, until sufficient time is available to replace the filter sector. To this end means are provided for selectively blocking the flow from a selected filtrate channel 32 until time permits for replacement of a damaged filter sector 24. The latter means include recess portions 49 formed in the surface of wear plate 37 corresponding in number to and registering to each opening 38 therein and each communicating with an outlet port 39 of the aligned filtrate channel 32. Recessed portions 49 are open at the periphery of wear plate 37 and are normally each closed by cap or plug member 52 which are detachably secured in sealed relationship to the peripheral opening of recess 49 by clamps 53 which are detachably held to shaft 12 by bolts 54. In this manner in normal operation of filter 11 filtrate flows uninterrupted from channels 32 outwardly of valve assembly 35 in accordance with a normal filtration cycle.

If in operation of filter 10, however, a filter sector 24 becomes damaged and interferes with the normal filtration process of filter 10 the rotation of shaft 12 is halted and cap 52 of the particular filtrate channel 32 involved is removed and a sealing plate 56 inserted in the recessed portion 49 and clamped in sealing position by clamp 53 with the walls of the recessed portion 49 providing means for positioning plate 56 against movement. In this manner the horizontal row of filter sectors 24 containing the damaged sector are inactive while the remaining rows of sectors 24 of discs 11 are operative upon operation of filter 10.

Figure 8:
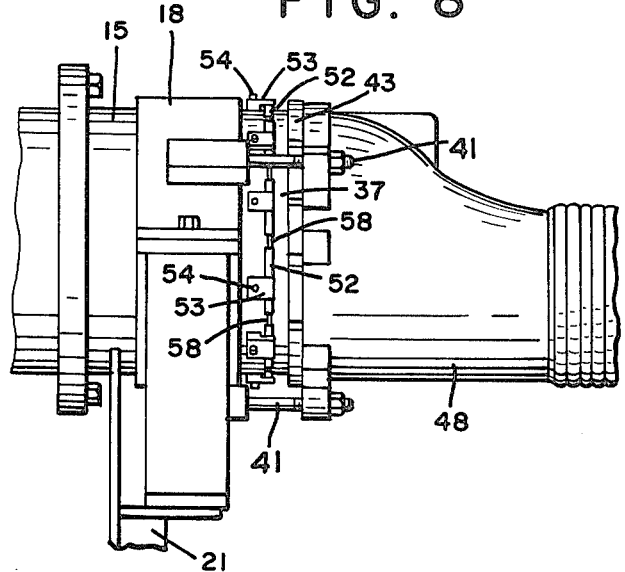
FIG. 8 is an elevational view of a valve assembly incorporating another embodiment of the present invention.
Figure 9:
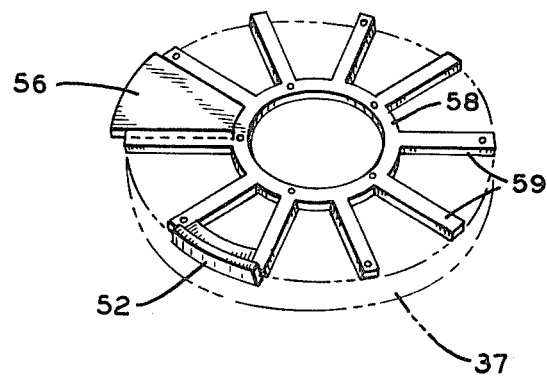
FIG. 9 is a perspective view of a spider plate of the embodiment of FIG. 8.

In FIGS. 8 and 9 is shown a further embodiment of the present invention. In this embodiment instead of forming recessed portions 49 in the surface of wear plate 37 a spider plate 58 is interposed between wear plate 37 and trunnion and 15 of shaft 12 and held in sealed relationship therewith by bolts 41 to function in the same manner as previously described with the spaced arms 59 of spider 58 adapted to receive and position between each adjacent pair thereof filtrate sealing blocking plates 56 as needed or plugs 52 in normal operation of filter 10 in the manner previously described with respect to recessed portions 49 of the embodiment of FIGS. 1 to 7.

As will now be understood by those skilled in the art the above described invention has many advantages in use. In accordance with the described structure operation of filter 10 is only momentarily interrupted to remove plug 52 and insert a sealing plate 56 when needed. In this manner the need for removing and replacing filter discs 24 may be delayed until such time as is advantageous for the user to interrupt normal operation of the particular process in which filter 10 is utilized for the prolonged period of time required to replace the sector.

Although, two embodiments of the present invention have been described in detail, it is to be expressly understood that the invention is not limited thereto. Various changes can be made in the design and arrangement of parts without departing from the spirit and scope thereof as the same will now be understood by those skilled in the art.

What is claimed is:

1. In a rotary disc vacuum filter having a bank of filter discs mounted on a center shaft assembly for rotation in a slurry tank through a filtration cycle wherein a filter cake is formed on said discs and filtrate is passed through said discs for discharge through a plurality of filtrate drainage channels in said center shaft assembly, said filter discs each comprising a series of filter sectors having filtrate flow connections with said filtrate channels, and valve means for controlling flow of filtrate from said filter channels outwardly of said filter, and including a stationary bridge plate having an opening through which said filtrate is discharged, the provision of means for interrupting filtrate flow from a selected channel which comprise,
   a. outlet port openings provided for said filtrate channels to communicate with the opening in said bridge plate for discharging said filtrate,
   b. a wear plate interposed between said bridge plate and said central shaft assembly,
   c. inlet port openings in said wear plate in registered alignment with said outlet ports of said filtrate channels for permitting flow of filtrate from said filtrate channels through said valve means in accordance with the position of said filtrate channels relative to said stationary bridge plate and d. means for selectively interrupting the flow of filtrate from a channel outlet port through an adjacent aligned opening in the adjacent wear plate and comprising a sealing plate member, positioning means arranged partially about said outlet port openings for receiving said sealing plate to seal said aligned ports, and means detachably securing said plate to said positioning means in said sealing position.

2. The filter of claim 1 wherein said positioning means comprise recessed portions formed in said wear plate in alignment with said filtrate channels, the wall portions defining said recessed portion adapted to receive and position said sealing plate member.

3. The device of claim 1 wherein said sealing plate securing means comprise a clamp member having one end secured to said shaft assembly and the other end in detenting engagement with the sealing plate.

4. The filter of claim 1 wherein said positioning means comprise a circular spider plate secured to said wear plate and having a plurality of arms with each pair of adjacent arms adapted to receive therebetween a said sealing plate.

5. The device of claim 1 wherein the remaining outlet ports of said filtrate channels and aligned openings inlet port in wear plate are provided with detachable cap members at the outer peripheries of said aligned members.

6. In a rotary vacuum disc filter having a bank of filter discs mounted on a center shaft assembly for rotation in a slurry tank through a filtration cycle wherein a filter cake is formed on said discs and filtrate is passed through said discs for discharge through a plurality of filtrate drainage channels in said center shaft assembly, said filter discs each comprising a series of filter sectors providing a plurality of rows of filter sectors about the periphery of said center shaft, each row of said sectors having filtrate flow connections with said filtrate channels, and a stationary valve means for controlling flow of filtrate from said filter channels outwardly of said filter and including a bridge plate having an opening through which the filtrate is discharged, the provision of means for interrupting filtrate flow from a selected channel which comprise, a. outlet port openings provided for said filtrate channels to communicate with opening in in said bridge plate for discharging said filtrate, b. a wear plate interposed between said bridge plate and said central shaft assembly for rotation with said center shaft, c. inlet port openings formed in said wear plate each in flowthrough communication with an outlet port of said filtrate channels for permitting flow of filtrate from said filtrate channels through said valve means in accordance with the position of said channel relative to said stationary bridge plate, and d. means carried by said wear plate for selectively interrupting the flow of filtrate from a channel outlet port through the aligned opening of the adjacent wear plate and including positioning means formed in said wear plate adjacent each of said openings adapted to position a removable sealing plate over said opening or alternatively a removable plug member sealing the periphery of said wear plate at said aligned openings to permit flow of filtrate from said channel.

7. The filter of claim 6 wherein said positioning means comprises recesses formed in the outer face of said wear plate about each of said openings therein, said face is secured to said center shaft, and detached clamp means for detenting said seal plate within said opening or alternatively said plug member.

8. The filter of claim 7 wherein said positioning means for said recessed portions comprise the wall portions thereof.

* * * * *